United States Patent [19]

Smaw

[11] 4,183,192
[45] Jan. 15, 1980

[54] METHOD AND APPARATUS FOR COUNTING STRAWS AND THE LIKE

[75] Inventor: Jesse B. Smaw, East Paterson, N.J.

[73] Assignee: Marcal Paper Mills, Inc., East Paterson, N.J.

[21] Appl. No.: 883,317

[22] Filed: Mar. 3, 1978

[51] Int. Cl.² .................. B65B 57/20; B65B 19/34
[52] U.S. Cl. ................................ 53/444; 53/501; 53/151; 53/236
[58] Field of Search ............. 53/444, 501, 540, 148, 53/151, 236; 198/560

[56] References Cited

U.S. PATENT DOCUMENTS

| | | | |
|---|---|---|---|
| 3,089,297 | 5/1963 | Craig et al. | 53/444 X |
| 3,128,585 | 4/1964 | Brownlee et al. | 53/515 X |
| 3,877,199 | 4/1975 | Lipes | 53/501 |

*Primary Examiner*—Travis S. McGehee
*Attorney, Agent, or Firm*—Burns, Doane, Swecker & Mathis

[57] ABSTRACT

A method and apparatus for counting paper straws and the like is disclosed, wherein the straws are arranged within channels of an endless conveyor so that the straws may be counted by an optical scanning device. As the straws are manufactured, they are conveyed to a hopper by means of a first endless conveyor. The hopper terminates in a pair of feed compartments above a second endless conveyor having a plurality of transverse channels. Rotating brushes are provided at the sides of the feed compartments, adjacent to the second conveyor to oscillate the straws in the compartments and to urge the straws into the transverse channels. The rotating brushes prevent more than one straw from occupying any one of the transverse channels. An optical scanning device accurately counts the straws while they are on the second conveyor, before they are deposited into a boxing apparatus. When a desired number of straws are collected into the boxing apparatus, the second conveyor and the brushes are stopped, and a series of rams are utilized to pack the straws into cardboard boxes so that the counting process may begin again.

11 Claims, 9 Drawing Figures

METHOD AND APPARATUS FOR COUNTING STRAWS AND THE LIKE

BACKGROUND OF THE INVENTION

The present invention relates generally to a method and apparatus for counting paper straws. More specifically, the invention relates to a method and apparatus for counting paper straws which have been individually prewrapped.

Paper straws are typically packaged in boxes containing a stated quantity of straws. To ensure that the stated quantity agrees with the actual number of straws in the box, it is necessary to count the straws before they are placed into boxes.

Machines of the prior art intended to be suitable for counting elongated articles such as straws, cigarettes and toothpicks, have typically required the articles to roll easily at some stage during the travel of the articles through the machine. These machines have not, however, been entirely successful in counting paper straws because of the inability of paper straws to roll easily when in contact with one another.

Counting machines of the prior art have generally included a hopper to feed the elongated articles at some stage in the counting process. Paper straws which have been individually wrapped in a paper wrapping are especially difficult to count quickly and easily in a counting machine having a hopper because of the tendency of the paper straws to form an arch within the hopper of the counting machine. The paper straws interact with one another within the arch to prevent each other from coming in contact with a carrier means within the machine.

In a prior art straw-counting machine, a rotary drum is positioned under a hopper. The drum has radial grooves of the proper size to receive two straws. A rotary brush is positioned at the edge of the hopper adjacent the drum to sweep the straws back into the hopper and to assure that only two straws are placed in each groove. A guard is positioned over the lower side of the drum periphery to retain the straws in the grooves as the drum rotates. At the opposite side of the drum, a stripper mechanism is provided to remove the straws from the grooves, allowing them to fall into a hopper where they are collected. A counter indicates the number of revolutions of the drum, and the total number of straws collected in the chamber can be computed from the number of revolutions of the drum. The disadvantage of this machine is that the drum must be rotated slowly enough to ensure that all of the grooves are filled, and there is uncertainty as to the number counted since occasionally a straw may be displaced from the groove just prior to passing under the brush, so that there are inaccuracies in the number of straws counted.

Another example of a similar type of feeding and counting apparatus is disclosed in the patent to Rose, U.S. Pat. No. 1,393,642.

As an example of prior attempts at packaging straws into a wrapping, Goldstein et al, U.S. Pat. No. 1,825,058, discloses a straw-packaging machine which includes a rotary drum with a plurality of radial grooves for receiving straws. Two straws are received in each groove. Loose straws are placed in a hopper and a narrow passage leads from the hopper to the periphery of the drum in alignment with the grooves in the drum. The passage is large enough for the straws to pass through one at a time, and a rotary brush at the bottom of the hopper applies pressure on the straws in the passage to urge them into the grooves in the drum. The straws are then displaced endwise from the grooves to be wrapped in paper and deposited in a separate hopper for packaging. The Goldstein et al patent, however, does not disclose the step of counting the wrapped straws.

OBJECTS AND SUMMARY OF THE INVENTION

Accordingly, it is an object of the present invention to provide a method and apparatus whereby paper straws may be quickly supplied from a hopper and accurately counted.

Another object of the present invention is to provide a method and apparatus whereby a supply of prewrapped paper straws which do not roll easily may be counted accurately and quickly without damaging the straws during the counting operation.

The apparatus of the present invention includes a first endless conveyor which receives straws from a plurality of strawmaking machines as the straws are produced. Means are provided on either side of the first conveyor to align the straws with one another so that they may be deposited into a hopper having a pair of feed compartments. The hopper is positioned above a second endless conveyor which has a width approximately one-third the length of a straw, and includes a plurality of transverse channels. Pairs of rotating brushes are provided at the bottom of the hopper on either side of the second conveyor to agitate the straws within the feed compartment so as to prevent the formation of arches and to ensure that only one straw occupies each channel of the second conveyor. An optical scanning device counts the straws at one end of the second conveyor before they are deposited into a boxing apparatus. The collected straws are then packaged into a cardboard box, by means of a series of rams which reduce the volume of the collected straws.

BRIEF DESCRIPTION OF THE DRAWINGS

A preferred embodiment of the apparatus of the present invention is shown in the accompanying drawings, in which like reference numerals have been applied to like drawings, wherein:

FIG. 3 is a side view of the apparatus of FIG. 1;

DETAILED DESCRIPTION OF THE PREFERRED EMBODIMENT OF THE PRESENT INVENTION

Figure 1:
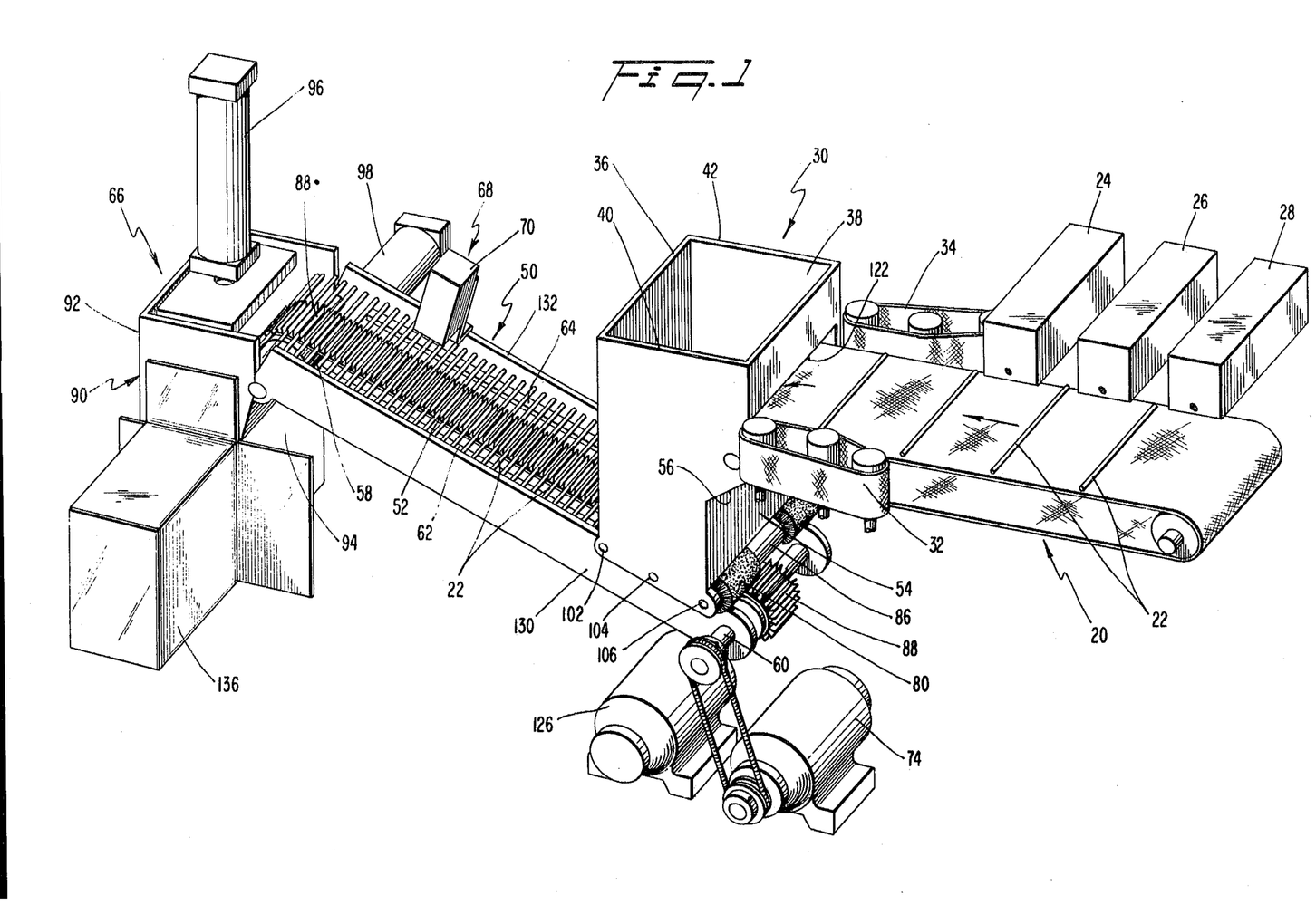
FIG. 1 is a perspective view of the apparatus of the present invention.

With reference to FIG. 1 of the drawings, the apparatus for counting straws includes a first endless conveyor 20 which receives straws 22 from a series of straw-producing machines 24, 26, 28. The straws 22, which are illustrated schematically in the drawings and may be either paper wrapped or unwrapped, are conducted by the first conveyor 20 towards a hopper 30. Endless guide belts 32, 34 are provided on either side of the first conveyor 20 to align the ends of the straws 22 with one another so that the straws may pass into the hopper 30.

The hopper 30 is formed by upright, parallel walls 36, 38 and by sidewalls 40, 42, which are spaced apart a distance slightly greater than the length of the paper straws to be counted. The spacing of the walls 40, 42 helps the straws to remain parallel with one another while within the hopper with the ends of the straws in vertical alignment with one another.

With reference now to FIG. 3, the hopper 30 terminates at its lower end in two feed compartments 44, 46. An upright wall 48, which is parallel to walls 36, 38, comprises a divider between the two feed compartments 44, 46. Another upright wall 54, including angled wall portion 56, forms the back side of feed compartment 46.

Referring again to FIG. 1, a second endless conveyor 50 has one end located directly beneath the two feed compartments 44, 46 of the hopper 30. The second endless conveyor 50 includes an elongated belt 52 centrally arranged beneath the hopper 30 having a width of approximately one-third the length of a straw 22 and traveling in a counterclockwise path about rollers 58, 60. So as to prevent the straws from falling off of the second conveyor 50, guide tracks 62, 64 are provided on either side of the belt 52 to support the straws as they are carried towards the boxing apparatus 66.

An optical scanning device 68 including a light source 70 and a sensor 72 is provided at one end of the second conveyor 50 to count the straws before they are deposited in the boxing apparatus 66. After a desired number of straws, typically 500, are deposited in the boxing apparatus 66, vertical ram 96 and horizontal ram 98 are extended to package the collected straws into a cardboard box 136.

Figure 2:
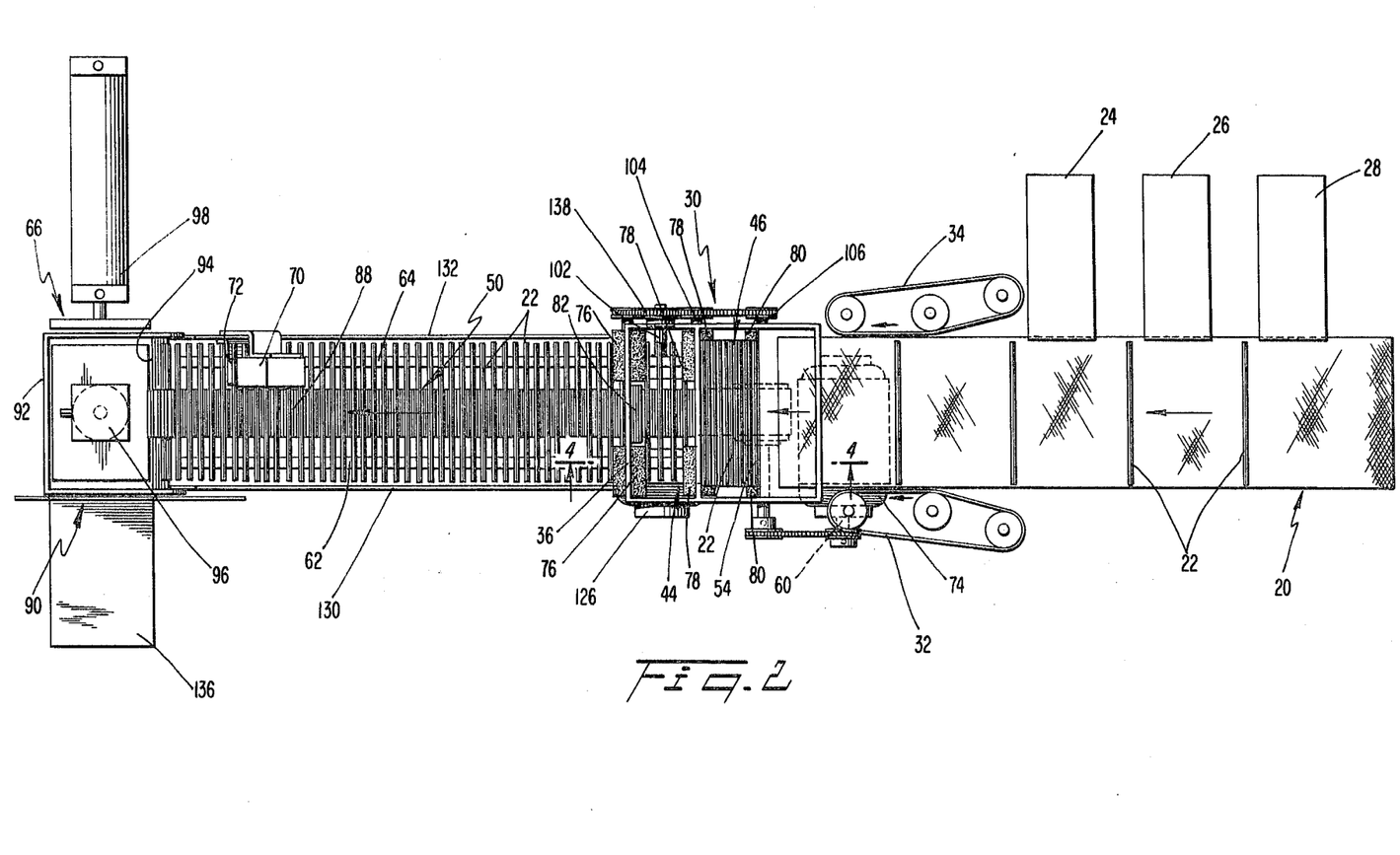
FIG. 2 is a top view of the apparatus of FIG. 1.

Referring now to FIG. 2, the straws 22 are deposited by the straw-producing machines 24, 26, 28 onto the first conveyor 20, generally parallel to one another. The ends of the straws, however, are usually not in alignment with one another. To align the ends of the straws, guide belts 32, 34 are provided on either side of the conveyor 20. Guide belt 32 travels in a counterclockwise direction and guide belt 34 travels in a clockwise direction so that the portions of the guide belts alongside the conveyor 20 may travel in the same direction as the conveyor. The guide belts 32, 34 travel at the same linear speed as does the conveyor 20 so that the straws 22 are not urged out of parallel alignment with one another while the guide belts align the ends of the straws. It is important that the straws enter the hopper 30 in parallel alignment so as to avoid becoming positioned lengthwise across the dividing wall 48 of the hopper 30.

After the straws have been deposited by the hopper 30 onto the second conveyor, the straws are conveyed to the boxing apparatus 66. Side guard rails 130, 132 are provided alongside the conveyor so as to ensure that the straws 22 do not come out of vertical alignment with one another and also to ensure that the straws do not fall off the second conveyor 50. It is important that the straws enter the boxing apparatus 66 in vertical alignment to one another.

Referring now to FIG. 3, the first conveyor 20 is arranged horizontally and travels in a counterclockwise manner so as to convey the straws 22 to the hopper 30. The straws enter the hopper 30 through a slot 122 beneath wall 38 and fall into either of the two feed compartments 44, 46. The lower portions of the feed compartments 44, 46 are open directly to the second conveyor 50 which is driven in a counterclockwise manner by motor 74.

The belt 52 of the second conveyor is inclined upwardly towards the boxing apparatus 66 and is provided with a plurality of transverse channels 88 which are of suitable dimensions to receive a single prewrapped straw. The channels 88 both arrange the straws on the belt 52 so as to facilitate counting by the optical scanning device 68 and also prevent the straws from sliding down the surface of the second conveyor. After the straws are counted by the optical scanning device 68, they are deposited into a receptacle 90 of the boxing apparatus 66. The receptacle 90 (see FIG. 2) is bounded on two sides by walls 92, 94 which are spaced apart a distance equal to the inside dimensions of the box 136. After a desired quantity of straws are collected in the receptacle 90, the vertical ram 96 (see FIG. 3) moves downward to closely pack the straws. While the ram 96 is at the bottom of its travel, the horizontal ram 98 (see FIG. 2) urges the collected straws into the box 136. The rams 96, 98 are then retracted so as to enable another group of straws to be collected in the receptacle 90. A box advancing mechanism (not shown) may be utilized to automatically provide a box 136 to be filled by the boxing apparatus 66. The box advancing mechanism would then automatically remove the filled box, close the open end of the box and then convey the box 136 away from the boxing apparatus 66.

Figure 4:
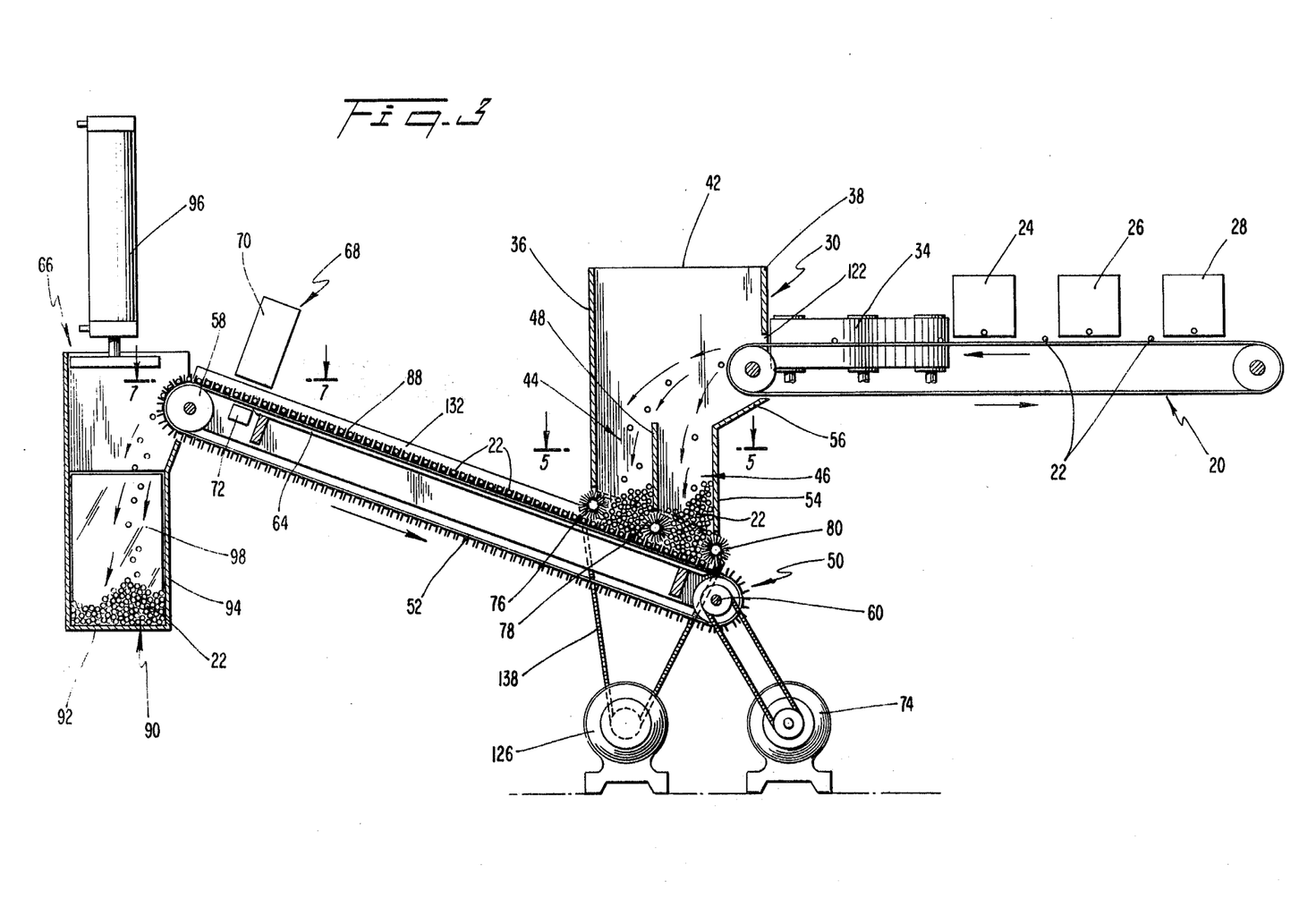
FIG. 4 is a section taken through lines 4—4 of FIG. 2 showing the arrangement of the brushes and the second conveyor.
Figure 5:
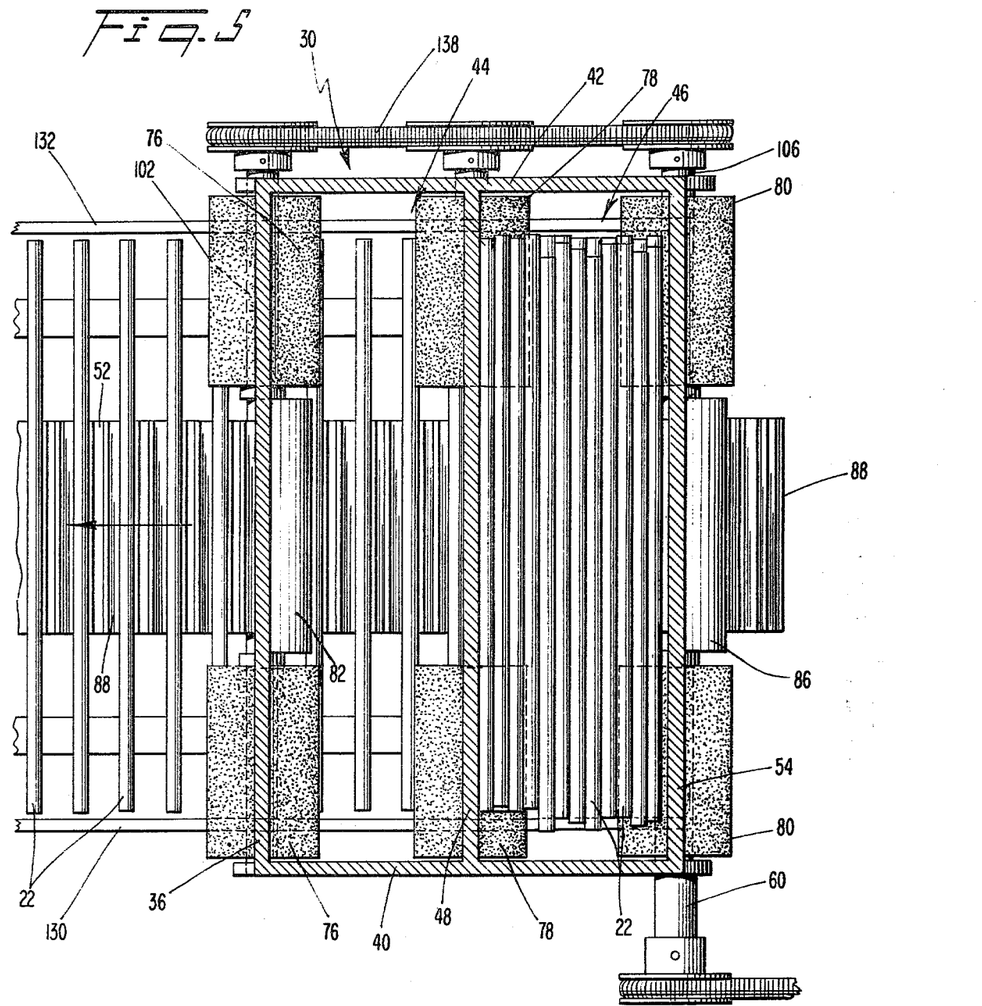
FIG. 5 is a section taken through lines 5—5 of FIG. 3 further illustrating the arrangement of the brushes and the second conveyor.

With reference now to the drawing of FIG. 4, the feed compartments 44, 46 of the hopper 30 are provided with pairs of rotating brushes 76, 78, 80 at the lower end of walls 36, 48, 52. As illustrated in FIG. 5, each pair of brushes 76, 78, 80 includes a brush on either side of the belt 52 of the second conveyor 50. As shown in FIG. 4, each pair of brushes 76, 78, 80 is driven by one of the three axles 102, 104, 106, which are in turn driven by a motor 126 and belt 138. All of the pairs of brushes 76, 78, 80 are driven in a counterclockwise manner (as viewed in FIG. 4) and rotate at the same speed. The brushes rotate at a linear speed which is considerably greater than the linear speed of the second endless conveyor belt 52.

With continued reference to FIG. 4, each of the walls 36, 48, 52 includes a lower curved portion 82, 84, 86 which extends between the two brushes of the pair and curves below the axle of the pair of brushes. The curved portions 82, 84, 86 prevent any straws from falling out of the hopper 30 by passing between a pair of brushes and one of the walls 36, 48, 52.

Figure 6:
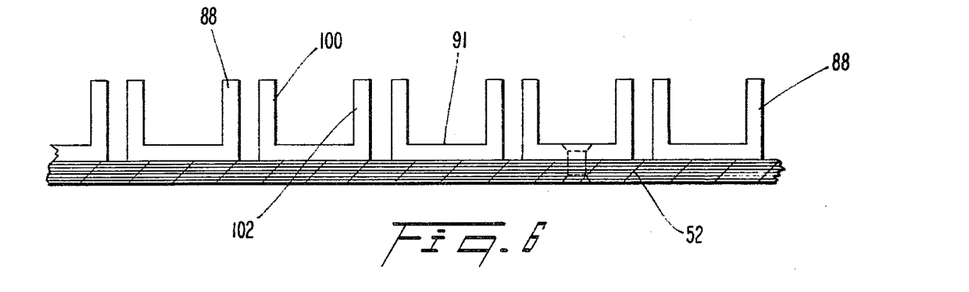
FIG. 6 is a side view of a portion of the second conveyor illustrating the transverse channels of the conveyor.

As illustrated in FIG. 6, each channel 88 of the belt 52 may consist of a metallic U-shaped member having a base 91 and sidewalls 100, 102. The channel 88 may be attached to the belt 52 transversely along the middle of the base 91 so as to enable the belt 52 to easily travel over the rollers 58, 60 (see FIG. 4).

Within continued reference to FIG. 4, the belt 52 is positioned beneath the pairs of brushes 76, 78, 80, so that the uppermost portion of the channels 88 passes just beneath the lowermost portion of the pairs of brushes 76, 78, 80. In this way, straws which are located within the channels 88 of the belt 52 do not come into contact with the rotating brushes as the belt 52 passes beneath the feed compartments 44, 46.

The pairs of brushes 78, 80 are provided beneath the walls 48, 52 so as to urge the straws of feed compartments 44, 46 into engagement with the channels 88 of the endless conveyor. The pairs of brushes 76, 78 act to prevent more than one straw from engaging a single channel at the same time. All of the pairs of brushes further cooperate to prevent the straws from forming an arch above the conveyor which would enable the straws to avoid coming into contact with the conveyor. Arching of the straws within the hopper or feed compartments is especially likely to occur if the straws are prewrapped in paper such as are individually wrapped drinking straws.

The pair of brushes 80, rotating in a counterclockwise manner beneath wall 52, urges a straw which comes into contact with the pair of brushes 80 downward towards the channels of the conveyor. When the brushes are turning, the endless belt 52 of the conveyor is continuously traveling beneath the feed compartment 46, so that the straws urged downward by the pair of brushes 80 are either received by an empty channel or carried by the endless conveyor towards the pair of brushes 78. The movement of the endless belt 52 cooperates with the rotation of the brushes 80 to prevent a straw from being forced between the brushes 80 and the endless belt 52 and thereby becoming damaged.

The counterclockwise rotation of the pair of brushes 78 which lie beneath the dividing wall 48, causes straws which are within feed compartment 46 to be urged upwardly against other straws in the feed compartment 46 to prevent arches from forming in that compartment. The brushes 78 tend to sweep upwardly any straws which are on the surface of the belt 52 and are not within a channel 88 of the belt. However, straws which are individually within a channel 88 are permitted to pass beneath the rotating brushes 78.

The pair of brushes 78 also act upon straws which are within feed compartment 44 in the same manner as the brushes 80 act on straws within feed compartment 46. The brushes 78, rotating in a counterclockwise manner beneath wall 48, urge a straw within feed compartment 44 which comes into contact with the pair of brushes 78 downward towards the channels of the conveyor. The endless belt 52 of the conveyor is continuously traveling beneath the feed compartment 44 whenever the brushes are turning so that the straws which are urged downwardly by the pair of brushes 78 are either received by an empty channel or carried by the endless conveyor towards the pair of brushes 76. The movement of the endless belt 52 cooperates with the rotation of the brushes 78 to prevent a straw from being forced between the brushes 78 and the endless belt 52 and thereby becoming damaged.

The pair of brushes 76 rotating counterclockwise beneath wall 36 act upon the straws within feed compartment 44 in the same manner that the pair of brushes 78 act on straws within feed compartment 46. The brushes 76 urge straws which are within feed compartment 44 upwardly against other straws in the feed compartment 44 to prevent arches from forming in that compartment. The brushes 76 tend to sweep upwardly any straws which are on the surface of the belt 52 and are not within a channel 88 of the belt. However, as with brushes 78, straws which are individually within a channel 88 of the belt 52 are permitted to pass beneath the rotating brushes 76.

Figure 7:
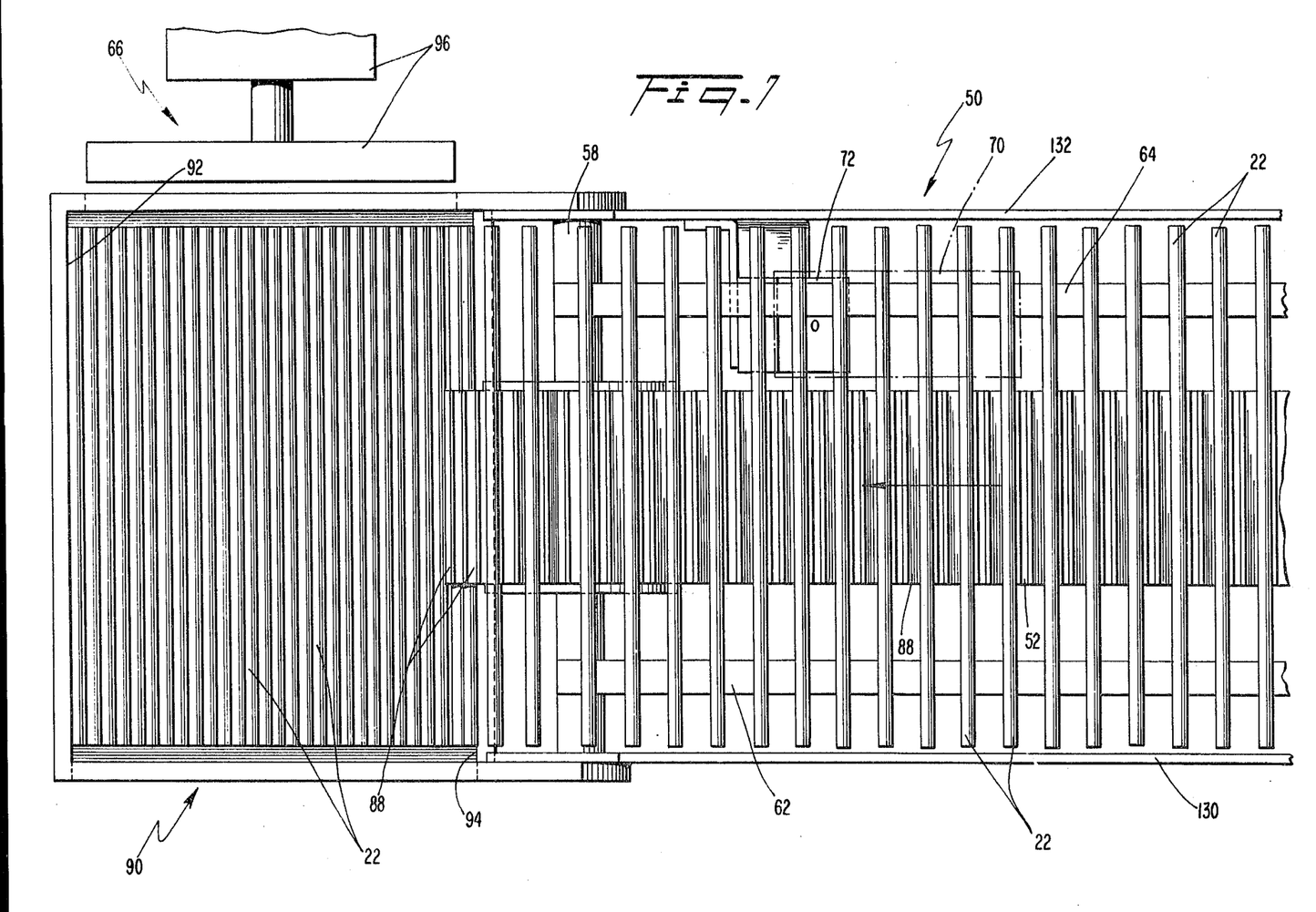
FIG. 7 is a section taken through lines 7—7 of FIG. 3 illustrating the arrangement of the second conveyor with the boxing apparatus.
Figure 8:
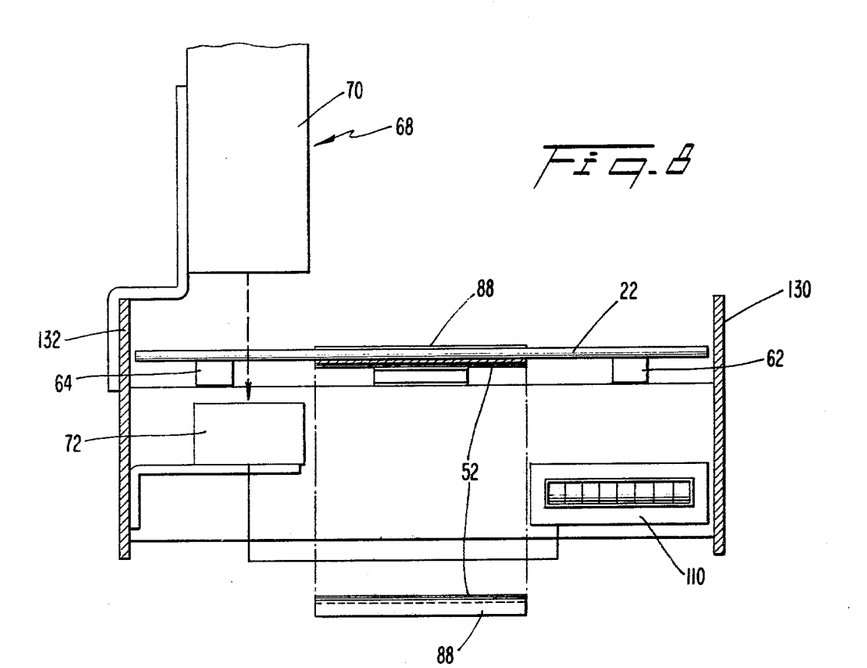
FIG. 8 is a schematic drawing of the arrangement of the optical scanning device with the second conveyor.

With reference now to FIGS. 7 and 8, the sensor 72 of the optical scanning device 68 is positioned between the belt 52 and the guide track 64 of the second conveyor. In this arrangement, the optical scanner may sense the passage of a straw each time the light received by the scanner from the light souce 70 is obstructed by a straw. The channels 88 of the second conveyor belt 52 help to keep the straws separated from one another by a short distance so as to permit light to pass between adjacent straws.

The light source 70 is positioned above the sensor 72 so that the travel of straws 22 interrupts the passage of light from the source to the scanner. A counter 110 is connected to the sensor 72 so as to provide a visual indication of the number of straws in the receptacle 90.

Figure 9:
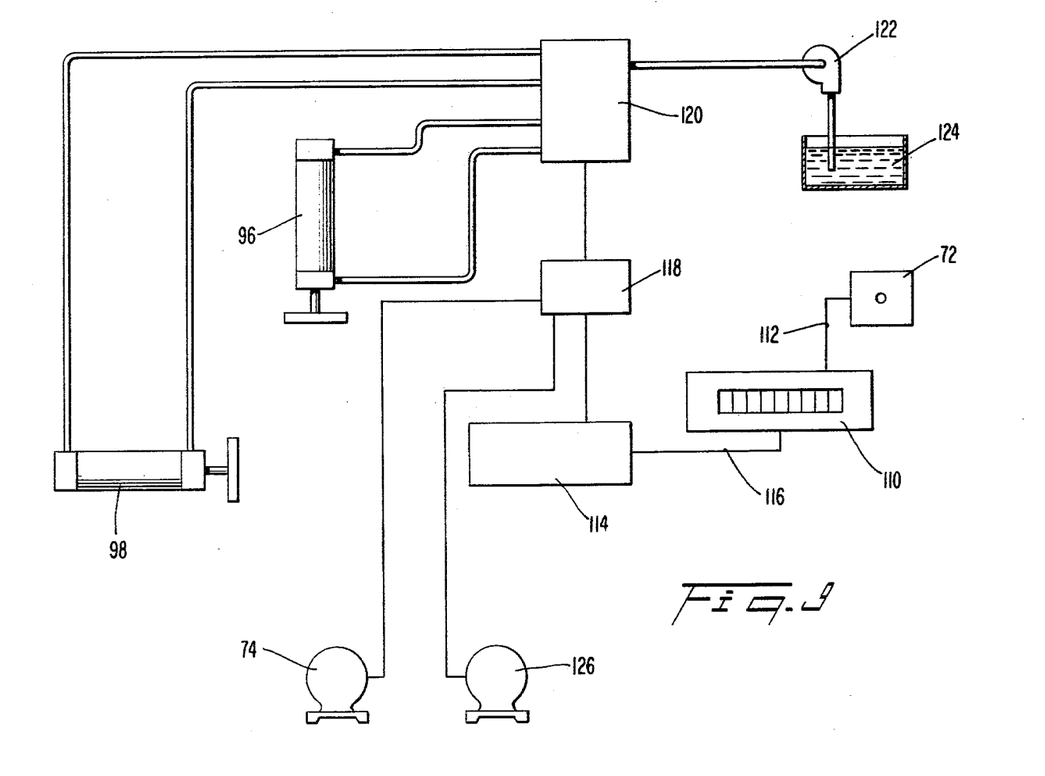
FIG. 9 is a schematic drawing of the control mechanism for the apparatus of FIG. 1.

With reference to FIG. 9, the control system of the straw counting machine is schematically illustrated. Whenever a straw passes beneath the light source 70, the detector 72 sends an electrical signal along conductor 112 to counter 110 which indicates the number of straws deposited in the receptacle 90. The counter 110 provides an electrical signal by means of conductor 116 to a register 114 which controls relay 118. The relay 118 permits the motor 74 to operate until the counter indicates that the desired number of straws have been collected in the receptacle 90. At that time the relay stops the motor 74 in order to stop the second conveyor 52. The relay 118 simultaneously stops the rotation of the pairs of brushes 76, 78, 80 whenever the belt 52 is stopped by controlling motor 126 which drives the three pairs of brushes. As soon as the motors 74, 126 are stopped, the relay 118 causes valve mechanism 120 to extend ram 96 in a downward direction to compact the straws. Then ram 98 is extended by the valve mechanism so as to urge the straws into the cardboard box 136. A pump 122 which is connected to a tank 124 and to the valve mechanism 120, drives the hydraulic rams 96, 98. After the box 96 is filled, the relay causes the valve mechanism to retract the rams and to start the motors 74 and 126 in order to again begin filling the receptacle 90.

Although the above detailed description of a preferred embodiment of the present invention relates to the counting of paper straws and more specifically to the counting of individually wrapped paper straws, this invention may be equally suitable for counting any articles which are substantially elongated. The detailed description above describes a preferred embodiment of this invention, and is not meant to be a limitation of the scope of the invention which is given by the claims appended hereto. Accordingly, this invention is defined by the claims, and all modifications and equivalents of the claims are expressly intended to be within the scope of the invention.

What is claimed is:

1. Apparatus for counting elongated articles, comprising:
    hopper means for receiving elongated articles, said hopper means including a first feed compartment;
    agitating means adjacent to the first feed compartment, said agitating means including rotary brushes positioned at a lower end of said first feed compartment to engage elongated articles within said first feed compartment;

a conveyor, extending beneath said first feed compartment, said conveyor including an endless belt provided with a plurality of channels, each channel being oriented transversely of the belt to receive a single elongagted article arranged transversely with respect to the conveyor belt; and counting means adjacent to the conveyor for determining the number of elongated articles carried by said endless belt.

2. Apparatus as recited in claim 1, wherein said hopper means includes a second feed compartment arranged in series with said first feed compartment and wherein said agitating means is also adjacent to the second feed compartment and includes rotary brushes positioned at a lower end of said second feed compartment.

3. Apparatus as recited in claim 1, further comprising:

collecting means adjacent to one end of said conveyor for receiving a predetermined quantity of elongated articles from said conveyor.

4. An apparatus for counting elongated articles, comprising:

a hopper for elongated articles wherein said hopper has a width in a horizontal direction that is slightly longer than the length of said elongated articles, said hopper having an upper and lower opening, said lower opening being bounded by first and second parallel, vertical walls wherein said first and second walls are also parallel to a line extending along said width of said hopper, said lower opening being divided into first and second feed compartments by a third vertical wall which is parallel to said first and second walls;

rotating brush means wherein said rotating brush means comprise three identical pairs of brushes, each pair of brushes comprising two cylindrically shaped brushes coaxially mounted on an axle, each brush of said pairs of brushes having a length along its central axis of about one-third the length of said elongated articles, each brush of said pairs of brushes being separated from each other by about one-third the length of said elongated objects, each pair of brushes being located immediately below one of said first, second and third vertical walls;

means to rotate said pairs of brushes mounted on said axles so that said brushes rotate in the same direction;

an endless conveyor, said endless conveyor being elongated in a generally horizontal direction and centrally located beneath said vertical walls so that an uppermost portion of said conveyor is substantially coplanar with a lowermost portion of said brushes, said endless conveyor including a moving belt provided with a plurality of transverse channels about its periphery, said channels having a cross-sectional area slightly larger than the cross-sectional area of said elongated objects, but said cross-sectional area of said channels being smaller than twice the cross-sectional area of said elongated objects;

a counting means for determining the number of said elongated articles carried by said belt; and container means for collecting the elongated articles carried by said belt until a predetermined number of said elongated articles have been collected.

5. An apparatus for counting straws, comprising:

a hopper including first and second feed compartments, said feed compartments being comprised of upright walls and each having a horizontal dimension that is slightly greater than the length of a straw, said hopper being open at the top so that a quantity of straws may be placed into the hopper, and said feed compartments being open at the bottom so that said straws may leave said hopper;

a flexible, endless conveyor, said conveyor having a width in a horizontal direction that is approximately one-third the length of a straw, said conveyor being located immediately beneath said first and second feed compartments and centrally arranged so that said conveyor travels in a generally horizontal direction that is perpendicular to said line of said first feed compartment that is along said dimension, said endless conveyor having a plurality of transverse channels, each channel having a cross-sectional area that is approximately equal to the cross-sectional area of a straw, said flexible, endless conveyor being provided so as to receive the straws within the channels of the conveyor;

a plurality of brushes for urging the straws to individually occupy the channels of the conveyor, the brushes being mounted on a series of three parallel axles, the axles being transverse to the endless conveyor and between the conveyor and the upright walls of the hoppers, said brushes having a length approximately equal to one-third of the length of a straw, and being located at either side of the endless conveyor, said brushes each rotating in the same direction;

an optical scanning means for determining the number of straws that have been carried by the endless conveyor; and a container for collecting the straws which are carried by the endless conveyor until a predetermined number of straws have been collected.

6. A method for counting elongated articles comprising the steps of:

arranging a supply of elongated articles within a hopper so that the articles are parallel with one another and transversly oriented with respect to an endless conveyor;

feeding said articles through one of two feed compartments provided at a lower end of said hopper to the endless conveyor;

urging said articles downward into individual engagement with transverse channels of said endless conveyor whereby said articles are arranged transversely on said conveyor belt;

brushing any of said articles not individually engaging a channel of said endless conveyor back into one of said feed compartments to agitate the articles within said one feed compartment;

counting said articles individually carried by said endless conveyor;

depositing a predetermined quantity of said articles into a container.

7. An apparatus for counting and packaging a predetermined number of elongated articles, comprising:

producing means for providing a supply of said elongated articles;

first endless conveyor means adjacent to said producing means for carrying said elongated articles away from said producing means;

a hopper provided at one end of said first endless conveying means for receiving said elongated articles from said producing means, said hopper terminating at its lower end in a feed compartment with said articles being arranged transversely within the hopper with respect to a second endless conveyor;

rotating brush means provided at a lower end of said feed compartment for moving said elongated articles while within said feed compartment;

the second endless conveyor having one end located beneath said feed compartment and comprising a belt provided with a plurality of channels, each channel being oriented transverse of the belt to receive an elongated article transversely with respect to the belt;

counting means provided at one end of said second conveyor for determining the number of elongated articles carried by said endless conveyor; and packaging means provided at one end of said second endless conveyor for receiving a predetermined quantity of said elongated articles and for packaging said quantity of straws.

8. Apparatus as recited in claim 7, wherein said hopper terminates at its lower end in first and second feed compartments arranged in series and wherein said rotating brush means are adjacent to the first and second feed compartments for agitating said elongated articles while within said feed compartments.

9. An apparatus for counting and packaging a predetermined number of elongated articles, comprising:

producing means for providing a supply of said elongated articles;

first endless conveying means provided adjacent to said producing means, said first conveying means including a smooth, flexible belt for carrying said elongated articles away from said producing means;

a hopper for elongated articles, said hopper being adjacent to one end of said first conveying means and receiving elongated articles from said first conveying means, wherein said hopper has a width in a horizontal direction that is slightly longer than the length of said elongated articles, said hopper having an upper and lower opening, said lower opening being bounded by first and second parallel, vertical walls wherein said first and second walls are also parallel to a line extending along said width of said hopper, said lower opening being divided into first and second feed compartments by a third vertical wall which is parallel to said first and second walls; rotating brush means wherein said rotating brush means comprise three identical pairs of brushes, each pair of brushes comprising two cylindrically shaped brushes coaxially mounted on an axle, each brush of said pairs of brushes having a length along its central axis of about one-third the length of said elongated articles, each brush of said pairs of brushes being separated from each other by about one-third the length of said elongated objects, each pair of brushes being located immediately below one of said first, second and third vertical walls;

means to rotate said pairs of brushes mounted on said axles so that said brushes rotate in the same direction;

a second endless conveyor, said endless conveyor being elongated in a generally horizontal direction and centrally located beneath said vertical walls so that an uppermost portion of said conveyor is substantially coplanar with a lowermost portion of said brushes, said endless conveyor including a moving belt provided with a plurality of transverse channels about its periphery, said channels having a cross-sectional area slightly larger than the cross-sectional area of said elongated objects, but said cross-sectional area of said channels being smaller than twice the cross-sectional area of said elongated objects;

a counting means for determining the number of said elongated articles carried by said belt; and container means for collecting the elongated articles carried by said belt until a predetermined number of said elongated articles have been collected.

10. An apparatus for counting and packaging a predetermined number of straws, comprising:

producing means for providing a supply of straws;

a first endless conveyor provided adjacent to said producing means for carrying said straws away from said producing means;

a hopper including first and second feed compartments, said feed compartments being comprised of upright walls and each having a horizontal dimension that is slightly greater than the length of a straw, said hopper being open at the top so that a quantity of straws may be placed into the hopper, and said feed compartments being open at the bottom so that said straws may leave said hopper;

a second endless conveyor, said conveyor having a width in a horizontal direction that is approximately one-third the length of a straw, said second conveyor being located immediately beneath said first and second feed compartments and centrally arranged so that said conveyor travels in a generally horizontal direction that is perpendicular to said line of said first feed compartment that is along said dimension, said endless conveyor having a plurality of transverse channels, each channel having a cross-sectional area that is approximately equal to the cross-sectional area of a straw, said second endless conveyor being provided so as to receive the straws within the channels of the second conveyor;

a plurality of brushes for urging the straws to individually occupy the channels of the second conveyor, the brushes being mounted on a series of three parallel axles, the axles being transverse to the second conveyor and between the conveyor and the upright walls of the hoppers, said brushes having a length approximately equal to one-third of the length of a straw, and being located at either side of the second conveyor, said brushes each rotating in the same direction;

an optical scanning means for determining the number of straws that have been carried by the endless conveyor;

a container for collecting the straws which are carried by the endless conveyor until a predetermined number of straws have been collected; and packaging means adjacent to said container for packaging said straws within said container.

11. A method for counting and packaging straws comprising the steps of:

producing a supply of straws;

conveying said supply of straws to a hopper;

arranging a supply of straws within the hopper so that the straws are parallel with one another and transverse with respect to an endless conveyor;

feeding said straws through one of two feed compartments provided at a lower end of said hopper to the endless conveyor;

urging said straws downward into individual engagement with channels of said endless conveyor whereby the straws are arranged transversely with respect to the endless conveyor;

brushing any of said straws not individually engaging a channel of said endless conveyor back into one of said feed compartments to agitate the straws within the feed compartment;

counting said straws individually carried by said endless conveyor;

depositing a predetermined quantity of straws into a container;

stopping said brushing and depositing of said straws when the predetermined quantity of straws is obtained;

packaging said predetermined quantity of straws into a box.

* * * * *